(12) United States Patent
Tu et al.

(10) Patent No.: US 12,476,917 B2
(45) Date of Patent: Nov. 18, 2025

(54) DATA TRAFFIC CONTROL METHOD AND SYSTEM FOR AN ELECTRONIC HORIZON BUS

(71) Applicant: Xiamen Yaxon Zhilian Technology Co., Ltd., Fujian (CN)

(72) Inventors: Yankai Tu, Fujian (CN); Hui Li, Fujian (CN); Xuhui Ye, Fujian (CN)

(73) Assignee: Xiamen Yaxon Zhilian Technology Co., Ltd., Xiamen (CN)

( * ) Notice: Subject to any disclaimer, the term of this patent is extended or adjusted under 35 U.S.C. 154(b) by 0 days.

(21) Appl. No.: 18/704,741

(22) PCT Filed: Sep. 27, 2022

(86) PCT No.: PCT/CN2022/121638
§ 371 (c)(1),
(2) Date: Apr. 25, 2024

(87) PCT Pub. No.: WO2023/071665
PCT Pub. Date: May 4, 2023

(65) Prior Publication Data
US 2024/0422103 A1    Dec. 19, 2024

(30) Foreign Application Priority Data
Oct. 25, 2021   (CN) .......................... 202111242894.1

(51) Int. Cl.
*H04L 47/125* (2022.01)
*H04L 12/40* (2006.01)
(52) U.S. Cl.
CPC ............ *H04L 47/125* (2013.01); *H04L 12/40* (2013.01); *H04L 2012/40215* (2013.01)

(58) Field of Classification Search
CPC ............... H04L 45/22; H04L 12/40006; H04L 12/40013; H04L 47/10; H04L 45/24;
(Continued)

(56) References Cited

U.S. PATENT DOCUMENTS 7,027,462 B2 * 4/2006 Benveniste ......... H04L 12/4013
370/445
9,882,805 B2 * 1/2018 Thankappan ........... H04L 45/22
(Continued)

FOREIGN PATENT DOCUMENTS

CN    105141447 A    12/2015
CN    109540162 A  * 3/2019  ......... G01C 21/3446
(Continued)

OTHER PUBLICATIONS

International Search Report cited in PCT/CN2022/121638 mailed Jan. 3, 2023, 5 pages.
(Continued)

*Primary Examiner* — Ninos Donabed
(74) *Attorney, Agent, or Firm* — Cooper Legal Group, LLC

(57) ABSTRACT

The present disclosure relates to a data traffic control method and system for an electronic horizon bus, the method including: generating, by an electronic horizon device, a traffic notification message according to bus messages, and sending to a bus gateway; and after the bus gateway receives the traffic notification message, determining, according to a load ratio of a target bus, whether forwarding the bus messages directly to the target bus would result in exceeding a reasonable load of the target bus, performing traffic control and then performing forwarding if exceeding, or performing direct forwarding if not exceeding.

6 Claims, 2 Drawing Sheets

(58) Field of Classification Search
CPC .......... H04L 67/12; H04L 2012/40273; H04L 12/40; H04L 2012/40215; H04L 47/125
See application file for complete search history.

(56) References Cited

U.S. PATENT DOCUMENTS

| | | | | |
|---|---|---|---|---|
| 2004/0100967 | A1* | 5/2004 | Robotham | H04L 47/30 370/412 |
| 2004/0179476 | A1* | 9/2004 | Kim | H04L 12/40143 370/360 |
| 2015/0211608 | A1* | 7/2015 | Himmelsbach | F16H 37/042 475/269 |
| 2016/0328561 | A1* | 11/2016 | Tamir | G06F 21/552 |
| 2017/0289271 | A1* | 10/2017 | Seed | H04L 67/148 |
| 2019/0182145 | A1* | 6/2019 | Yan | H04L 12/66 |
| 2019/0182152 | A1* | 6/2019 | Yan | H04L 45/655 |
| 2019/0280978 | A1* | 9/2019 | Schmatz | H04L 47/20 |
| 2020/0193659 | A1* | 6/2020 | Bar | G06F 40/30 |
| 2020/0294401 | A1* | 9/2020 | Kerecsen | G08G 1/205 |
| 2021/0279188 | A1* | 9/2021 | Goss | G06F 12/0246 |

FOREIGN PATENT DOCUMENTS

| | | | | |
|---|---|---|---|---|
| CN | 110971620 | A | | 4/2020 |
| CN | 113110172 | A * | 7/2021 | ......... G05B 19/0428 |

OTHER PUBLICATIONS

Written Opinion cited in PCT/CN2022/121638 mailed Jan. 3, 2023, 7 pages.

* cited by examiner

DATA TRAFFIC CONTROL METHOD AND SYSTEM FOR AN ELECTRONIC HORIZON BUS

CROSS-REFERENCE TO RELATED APPLICATIONS

This application is a national stage entry of PCT Patent Application PCT/CN2022/121638, filed Sep. 27, 2022, which claims priority to Chinese Patent Application 202111242894.1, filed on Oct. 25, 2021. PCT Patent Application PCT/CN2022/121638 and Chinese Patent Application 202111242894.1 are incorporated herein by reference.

TECHNICAL FIELD

The present disclosure relates to the technical field of bus data communication, and in particular to a data traffic control method and system for an electronic horizon bus.

BACKGROUND

E-Horizon is an electronic horizon technology, which has a real-time positioning function and built-in high-precision map data, and can help a vehicle to obtain road information for a long distance ahead. A horizon device sends the road information to a CAN bus of a car through a standard ADAS IS V2 protocol, so that other control ECUs of the vehicle can obtain road prediction information ahead to optimize control.

According to the protocol standard, the ADAS IS V2 protocol includes a POSITION message (position information), a SEGMENT message (road information), a STUB message (intersection information), a PROFILE message (road details such as road slope, curvature, and traffic marks), and METADATA (map version information) etc.

Due to a large amount of data in map data ahead, when sending ADAS IS V2 messages to the bus, it needs to consider that a bus load should not be exceeded. Otherwise, the bus may fail or data message loss may occur. However, the interior of the car is often composed of a plurality of buses, which are converted by a gateway thereamong, and a baud rate of each bus is not the same. Therefore, even if an E-Horizon system matches a load of a bus currently connected to it, when the gateway forwards data to a bus with a lower baud rate, it may still possible to exceed a load of the bus, resulting in the following problem for the bus: if a message load is matched according to a bus with a lowest baud rate of the vehicle, a device on a network segment with a high baud rate may have a loss in the amount and accuracy of the received data. Therefore, matching the speed of sending messages and the amount of sending data of the E-Horizon with a single baud rate cannot be adapted to the whole vehicle network and device applications on each network segment.

SUMMARY

In order to solve the above problem, the present disclosure provides a data traffic control method and system for an electronic horizon bus.

Specific solutions are as follows:

A data traffic control method for an electronic horizon bus, wherein the traffic control method comprises the following steps:

S1: generating, by an electronic horizon device, a traffic notification message according to bus messages to be sent, and sending the traffic notification message to a bus gateway, wherein the traffic notification message contains the number of various types of messages in the bus messages to be sent; and S2: detecting in real time, by the bus gateway, a load ratio of each bus connected to the bus gateway, extracting the number of various types of messages contained in the traffic notification message after the bus gateway receives the traffic notification message, determining, according to a detected load ratio of a target bus, whether forwarding the bus messages to be sent directly to the target bus would result in exceeding a reasonable load of the target bus, performing traffic control on the bus messages to be sent and then performing forwarding if exceeding, or performing direct forwarding if not exceeding.

Further, the various types of messages in the bus messages includes a POSITION message, a PROFILE message, a SEGMENT message, a STUB message, and a METADATA message.

Further, a manner for determining whether forwarding the bus messages to be sent directly to the target bus would result in exceeding a reasonable load of the target bus in the step S2 is as follows:

S211: calculating a remaining carrying space p1 of the target bus according to the load rate ki and a baud rate p of the target bus: $p1=p*(1-ki)$;

S212: calculating a maximum number of messages forwarded by the target bus $D=1000T*p*(1-ki)/M$ based on a maximum message forwarding delay T corresponding to the target bus, the remaining carrying space p1 of the target bus and the number of digits M contained in each standard CAN message;

S213: determining whether the total number of various types of messages contained in the bus messages to be sent is greater than the maximum number D of messages forwarded by the target bus; if yes, determining that forwarding the bus messages to be sent directly to the target bus would result in exceeding the reasonable load of the target bus; if no, determining that forwarding the bus messages to be sent directly to the target bus would not result in exceeding the reasonable load of the target bus.

Further, a process of the traffic control in the step S2 comprises the following steps:

S221: determining whether the total number of various types of messages in the bus messages to be sent with a METADATA message deleted is greater than a maximum number of messages forwarded by the target bus; if yes, proceeding to S222; if no, forwarding the bus messages with the METADATA message deleted;

S222: after down-sampling PROFILE messages in the bus messages with a METADATA message deleted, determining whether the total number of various types of messages in the downsampled bus messages is greater than the maximum number of messages forwarded by the target bus; if yes, downsampling the PROFILE messages again based on the downsampling until the times of downsampling is greater than a times threshold and proceeding to S223; if no, forwarding the downsampled bus messages; and S223: sending a forwarding exception notification message to the target bus.

Further, the downsampling is one half sampling.

A traffic control system for electronic horizon bus data, wherein the system comprises an electronic horizon device, a bus gateway and a target bus, and the system implements the steps of the data traffic control method for an electronic horizon bus in the embodiments of the present disclosure.

The present disclosure adopts the above technical solutions to increase a flow control frame between the electronic horizon device and the bus gateway of the car, and the bus gateway carries out load monitoring of messages forwarded to each destination network segment and ADAS IS V2 traffic control, so as to realize the accuracy and stability of the application of the vehicle electronic horizon.

DESCRIPTION OF EMBODIMENTS

To further illustrate the embodiments, the present disclosure is provided with accompanying drawings. The accompanying drawings, which constitute a part of the disclosure of the present disclosure, are mainly intended to illustrate the embodiments, and may, together with relevant description of the specification, serve to explain the principles of operation of the embodiments. With these references in mind, a person of ordinary skill in the art will appreciate other possible implementations and advantages of the present disclosure.

The present disclosure will now be further illustrated with reference to the accompanying drawings and the detailed description.

A First Embodiment

Figure 1:
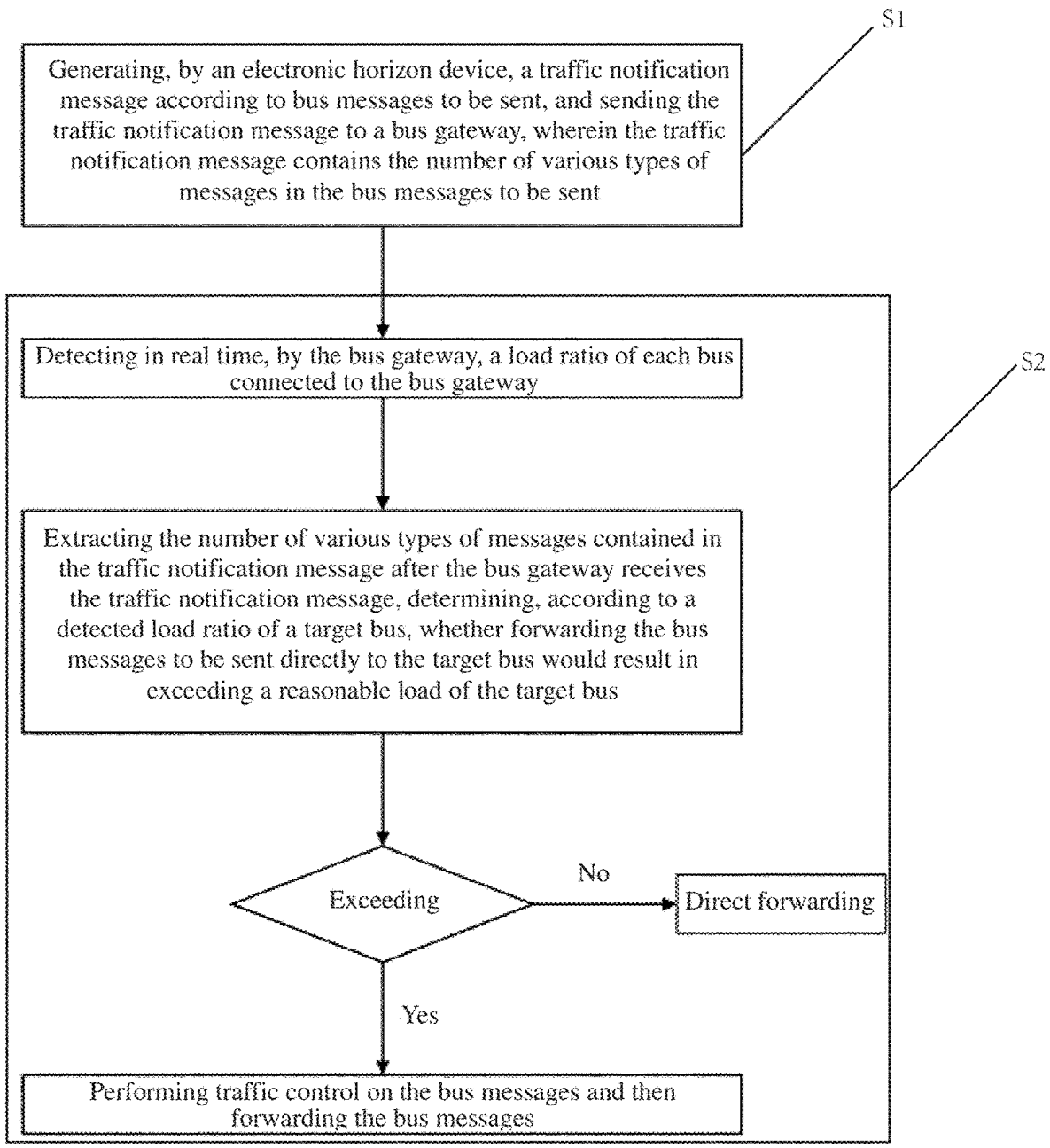
FIG. 1 is a flow chart of a method in a first embodiment of the present disclosure.
Figure 2:
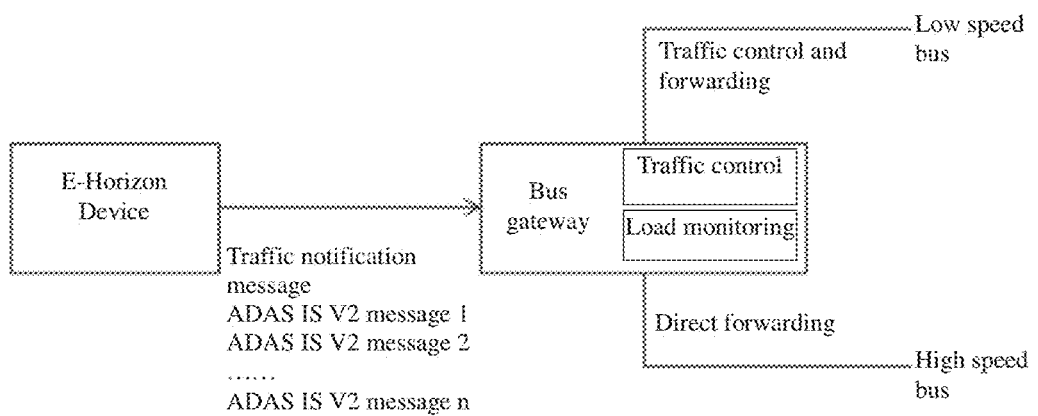
FIG. 2 is a schematic diagram of traffic control in a first embodiment of the present disclosure.

An embodiment of the present disclosure provides a data traffic control method for an electronic horizon bus, as shown in FIG. 1 and FIG. 2, wherein the traffic control method comprises the following steps:

S1: generating, by an electronic horizon (E-Horizon) device, a traffic notification message according to bus messages to be sent, and sending the traffic notification message to a bus gateway.

When the electronic horizon device updates geographical data of a visual field in front of a vehicle, it would retrieve and assemble all bus messages through a map engine according to an ADAS IS V2 (Advanced Driver Assistance System Interface Specification) standard. Because the number of bus messages may exceed a load of a target bus to receive the bus messages, the bus messages are not sent directly to the target bus, but are forwarded through a bus gateway. The traffic notification message generated according to the bus messages are used in a specific forwarding process. The traffic notification message contains the number of various types of messages in the bus messages to be sent. Further, the various types of messages in the bus messages includes a POSITION message, a PROFILE message, a SEGMENT message, a STUB message, and a METADATA message, the amount of which are expressed by $M_1$, $M_2$, $M_3$, $M_4$ and $M_5$ respectively.

S2: detecting in real time, by the bus gateway, a load ratio of each bus connected to the bus gateway, extracting the number of various types of messages contained in the traffic notification message after the bus gateway receives the traffic notification message, determining, according to a detected load ratio of a target bus, whether forwarding the bus messages to be sent directly to the target bus would result in exceeding a reasonable load of the target bus, performing traffic control on the bus messages to be sent and then performing forwarding if exceeding, or performing direct forwarding if not exceeding, that is, all the data behind the bus messages to be sent is directly forwarded to the target bus.

A method for monitoring the load rate of the bus by the bus gateway can be an existing method (such as the invention patent application "CAN bus load rate monitoring method and system" with the public number of CN201510447975.3), which is not detailed herein.

After receiving the traffic notification message, the bus gateway can extract the amount of various types of messages contained in the bus message to be sent which generates the traffic notification message, that is, the values of $M_1$, $M_2$, $M_3$, $M_4$, and $M_5$.

The detected load ratio can be used to determine whether directly forwarding, by the bus gateway, the bus message to be sent to the target bus exceeds the reasonable load of the target bus (the reasonable load is determined by the performance of the target bus), wherein a specific determination process comprises the following steps:

S211: calculating a remaining carrying space p1 of the target bus according to the load rate ki and a baud rate p of the target bus (unit: kbps): $p1=p*(1-ki)$, wherein ki indicates a load ratio of ith bus.

S212: calculating a maximum number of messages forwarded by the target bus $D=1000T*p*(1-ki)/M$ based on a maximum message forwarding delay T corresponding to the target bus, the remaining carrying space p1 of the target bus and the number of digits M contained in each standard CAN message.

The maximum message forwarding delay T is determined by practical requirements of an electronic horizon application. The number of bits contained in each standard CAN message is fixed.

S213: determining whether the total number $(M_1+M_2+M_3+M_4+M_5)$ of various types of messages contained in the bus messages to be sent is greater than the maximum number D of messages forwarded by the target bus; if yes, determining that forwarding the bus messages to be sent directly to the target bus would result in exceeding the reasonable load of the target bus, that is, the target bus cannot carry the forwarding of electronic horizon data by the bus gateway; if no, determining that forwarding the bus messages to be sent directly to the target bus would not result in exceeding the reasonable load of the target bus, that is, the target bus can fully carry the forwarding of electronic horizon data by the bus gateway.

A process of the traffic control in this example comprises the following steps:

S221: determining whether a total number $(M_1+M_2+M_3+M_4)$ of various types of messages in the bus messages to be sent with a METADATA message deleted is greater than a maximum number D of messages forwarded by the target bus; if yes, proceeding to S222; if no, forwarding the bus messages with the METADATA message deleted.

Because the METADATA message transmits information such as a map version, they do not affect the application of the electronic horizon function. Therefore, these messages are deleted first during the traffic control.

S222: after down-sampling PROFILE messages in the bus messages with a METADATA message deleted, determining whether the total number of various types of messages in the downsampled bus messages is greater than the maximum number of messages forwarded by the target bus; if yes, downsampling the PROFILE messages again based on the downsampling until the times of downsampling is greater than a times threshold and proceeding to S223; if no, forwarding the downsampled bus messages; and The PROFILE messages are messages that represent, with an equal interval, discrete points such as a slope and curvature of the road. For example, if an original PROFILE interval is 10 meters, there are 100 PROFILE messages for prediction of 1 km ahead of the road. Each profile message corresponds to the slope and curvature of a road point. Therefore, they are messages with a largest amount. The PROFILE messages are half sampled so as to reduced PROFILE messages by half to M2/2 messages, which reduces the accuracy of electronic horizon data. In this example, the interval is changed from 10 meters to 20 meters. However, the overall application after forwarding is not affected and normal functions are guaranteed.

Determining whether $M_1+M_2/2+M_3+M_4$ is greater than D. If yes, repeating this step and one half sampling the remaining PROFILE messages until the message interval of the PROFILE messages exceeds 50 m (the times threshold is 2). If yes, it indicates that after the downsampling process, the target bus can carry the forwarding of the electronic horizon data by the bus gateway. In this case, $M_1+M_2/2^n+M_3+M_4$ frame messages after the downsampling process are forwarded to the target bus, wherein n represents the times of downsampling.

S223: sending a forwarding exception notification message to the target bus.

The exception notification message is forwarded to remind the target bus that the load is too large and cannot be forwarded in time, so that the device that applies the electronic horizon data on the target bus can handle a delay.

The embodiment of the present disclosure guarantees, as much as possible, the reliability and real-time performance of an in-vehicle gateway for forwarding electronic horizon data under a complex vehicle network structure, which ensures the application of the horizon technology in the vehicle.

A Second Embodiment

The present disclosure also provides a traffic control system for electronic horizon bus data, wherein the system comprises an electronic horizon device, a bus gateway and a target bus which are mounted on a vehicle, and the system implements the steps of the method embodiment in the first embodiment of the present disclosure.

While the present disclosure has been particularly illustrated and described with references to the preferred embodiments, it will be understood by a person skilled in the art that all changes in form and details made to the present disclosure without departing from the spirit and scope of the present disclosure as defined by the appended claims fall within the protection scope of the present disclosure.

The invention claimed is:

1. A data traffic control method for an electronic horizon bus, wherein the data traffic control method comprises the following steps:

S1: generating, by an electronic horizon device, a traffic notification message according to bus messages to be sent, and sending the traffic notification message to a bus gateway, wherein the traffic notification message contains a number of various types of messages in the bus messages to be sent, wherein the various types of messages in the bus messages include a POSITION message, a PROFILE message, a SEGMENT message, a STUB message, and a METADATA message; and S2: detecting in real time, by the bus gateway, a load ratio of each bus connected to the bus gateway, extracting the number of the various types of messages contained in the traffic notification message after the bus gateway receives the traffic notification message, determining, according to a detected load ratio of a target bus, whether forwarding the bus messages to be sent directly to the target bus would result in exceeding a specified load of the target bus, performing traffic control on the bus messages to be sent and then performing forwarding when the specified load is exceeded, or performing direct forwarding when the specified load is not exceeded;

wherein determining whether forwarding the bus messages to be sent directly to the target bus would result in exceeding the specified load of the target bus in the step S2 comprises the following steps:

S211: calculating a remaining carrying space p1 of the target bus according to a load rate ki and a baud rate p of the target bus according to the equation: $p1=p*(1-ki)$;

S212: calculating a maximum number D of messages forwarded by the target bus according to the equation $D=1000T*p*(1-ki)/M$ based on a maximum message forwarding delay T corresponding to the target bus, the remaining carrying space p1 of the target bus and a number of digits M contained in each standard controller area network (CAN) message;

S213: determining whether a total number of the various types of messages contained in the bus messages to be sent is greater than the maximum number D of the messages forwarded by the target bus; when the total number of the various types of messages contained in the bus messages to be sent is greater than the maximum number D of the messages forwarded by the target bus, determining that forwarding the bus messages to be sent directly to the target bus would result in exceeding the specified load of the target bus; and when the total number of the various types of messages contained in the bus messages to be sent is not greater than the maximum number D of the messages forwarded by the target bus, determining that forwarding the bus messages to be sent directly to the target bus would not result in exceeding the specified load of the target bus.

2. The data traffic control method for an electronic horizon bus according to claim 1, wherein performing the traffic control in the step S2 comprises the following steps:

S221: determining whether a total number of the various types of messages in the bus messages to be sent with a METADATA message deleted is greater than a maximum number of messages forwarded by the target bus; when the total number of the various types of messages in the bus messages to be sent with the METADATA message deleted is greater than the maximum number of messages forwarded by the target bus, proceeding to S222; when the total number of the various types of messages in the bus messages to be sent with the METADATA message deleted is not greater than the maximum number of messages forwarded by the target bus, forwarding the bus messages with the METADATA message deleted;

S222: after downsampling PROFILE messages in the bus messages with the METADATA message deleted to obtain downsampled bus messages, determining whether a total number of the various types of messages in the downsampled bus messages is greater than the maximum number of messages forwarded by the target bus; when the total number of the various types of messages in the downsampled bus messages is greater than the maximum number of messages forwarded by the target bus, downsampling the PROFILE messages again based on the downsampling until a times of downsampling is greater than a times threshold and proceeding to S223; when the total number of the various types of messages in the downsampled bus messages is not greater than the maximum number of messages forwarded by the target bus, forwarding the downsampled bus messages; and S223: sending a forwarding exception notification message to the target bus.

3. The data traffic control method for an electronic horizon bus according to claim 2, wherein the downsampling is one half sampling.

4. A traffic control system for electronic horizon bus data, wherein the traffic control system comprises the electronic horizon device, the bus gateway and the target bus, and the traffic control system implements the steps of the data traffic control method for an electronic horizon bus according to claim 1.

5. A traffic control system for electronic horizon bus data, wherein the traffic control system comprises the electronic horizon device, the bus gateway and the target bus, and the traffic control system implements the steps of the data traffic control method for an electronic horizon bus according to claim 2.

6. A traffic control system for electronic horizon bus data, wherein the traffic control system comprises the electronic horizon device, the bus gateway and the target bus, and the traffic control system implements the steps of the data traffic control method for an electronic horizon bus according to claim 3.

* * * * *